(12) United States Patent
Graham et al.

(10) Patent No.: US 8,368,041 B2
(45) Date of Patent: Feb. 5, 2013

(54) SYSTEM AND METHOD FOR COMPENSATING FOR THERMAL EFFECTS IN AN EUV LIGHT SOURCE

(75) Inventors: Matthew R. Graham, San Diego, CA (US); Olav Haugan, San Diego, CA (US); William N. Partlo, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 62 days.

(21) Appl. No.: 13/077,958

(22) Filed: Mar. 31, 2011

(65) Prior Publication Data
US 2012/0248341 A1    Oct. 4, 2012

(51) Int. Cl.
*G21K 5/04*    (2006.01)
*G03B 27/42*    (2006.01)

(52) U.S. Cl. ..................... 250/504 R; 355/30
(58) Field of Classification Search ............... 250/493.1, 250/503.1, 504 R; 355/30
See application file for complete search history.

(56) References Cited

U.S. PATENT DOCUMENTS

| | | | |
|---|---|---|---|
| 2002/0012109 A1* | 1/2002 | Suzuki et al. ................... | 355/53 |
| 2002/0036758 A1* | 3/2002 | de Mol et al. .................. | 355/53 |
| 2005/0254154 A1* | 11/2005 | del Puerto .................... | 359/883 |
| 2006/0289806 A1* | 12/2006 | Simmons et al. .......... | 250/493.1 |
| 2007/0158596 A1 | 7/2007 | Oliver et al. | |
| 2009/0122429 A1 | 5/2009 | Watson et al. | |
| 2010/0328639 A1 | 12/2010 | Jak et al. | |
| 2011/0131004 A1* | 6/2011 | Cloetens ...................... | 702/132 |
| 2011/0140008 A1* | 6/2011 | Bergstedt et al. ......... | 250/504 R |
| 2011/0253349 A1* | 10/2011 | Ershov et al. ............. | 165/109.1 |

* cited by examiner

*Primary Examiner* — Robert Kim
*Assistant Examiner* — David E Smith
(74) *Attorney, Agent, or Firm* — Gard & Kaslow LLP

(57) ABSTRACT

A method and apparatus for compensating for thermal effects on the focal spot of a lens used to focus a laser beam on a target material at an irradiation site in a laser produced plasma (LPP) extreme ultraviolet (EUV) light system is disclosed. The EUV energy output of the light system is measured at sample intervals as a proxy for the laser power. The thermal load on the focusing lens is estimated from the measured EUV power, the expected change in the focal length of the lens for the thermal load is calculated, and the lens position is adjusted to compensate for the calculated focal length change. The actual position of the lens may be determined and compared to its desired position, and adjusted to insure that it remains in the desired position.

13 Claims, 5 Drawing Sheets

SYSTEM AND METHOD FOR COMPENSATING FOR THERMAL EFFECTS IN AN EUV LIGHT SOURCE

FIELD OF THE INVENTION

The present invention relates generally to laser produced plasma extreme ultraviolet light sources. More specifically, the invention relates to a method and apparatus for compensating for thermal effects on the focal spot of a lens used to focus a laser on a target material at an irradiation site.

BACKGROUND OF THE INVENTION

The semiconductor industry continues to develop lithographic technologies which are able to print ever-smaller integrated circuit dimensions. Extreme ultraviolet ("EUV") light (also sometimes referred to as soft x-rays) is generally defined to be electromagnetic radiation having wavelengths of between 10 and 120 nm. EUV lithography is currently generally considered to include EUV light at wavelengths in the range of 10-14 nm, and is used to produce extremely small features, for example, sub-32 nm features, in substrates such as silicon wafers. These systems must be highly reliable and provide cost effective throughput and reasonable process latitude.

Methods to produce EUV light include, but are not necessarily limited to, converting a material into a plasma state that has one or more elements, e.g., xenon, lithium, tin, indium, antimony, tellurium, aluminum, etc., with one or more emission line(s) in the EUV range. In one such method, often termed laser produced plasma ("LPP"), the required plasma can be produced by irradiating a target material, such as a droplet, stream or cluster of material having the desired line-emitting element, with a laser beam at an irradiation site.

The line-emitting element may be in pure form or alloy form, for example, an alloy that is a liquid at desired temperatures, or may be mixed or dispersed with another material such as a liquid. Delivering this target material and the laser beam to a desired irradiation site simultaneously for plasma initiation presents certain timing and control problems, as it is necessary to hit the target properly in order to obtain a good plasma, and thus good EUV light.

One such problem involves the fact that there is generally a focusing lens that focuses the laser beam on the irradiation site. (There may also be other lenses between the laser source and the irradiation site, but only the final lens will directly focus the beam on the irradiation site.) It is desirable that the focal spot, or "waist," of the focusing lens coincide with the irradiation site at which the target material is located so that the maximum effect of the laser energy may be obtained in forming the plasma. The terms focal "spot" and "waist" are used herein, rather than focal "point," as physical lenses actually focus to a narrowest spot of measurable width, i.e., the focal spot or waist, rather than to an actual point as might be seen with a theoretical, mathematically perfect lens.

The focusing lens has a nominal focal length (the center of the focal spot) of a particular distance at a given temperature. Thus, in the absence of any other effect, the focal spot of the lens will produce the maximum intensity of the laser at a particular point of the laser path corresponding to the nominal focal length. It is well known, however, that the lens absorbs energy from the laser beam as the beam passes through the lens, and the lens will thus be expected to be subject to thermal effects which may change its focal length.

If the thermal load on the lens is constant, for example, if the laser is on continuously, then the lens will arrive at a steady state of this thermal effect in some period of time, typically on the order of a few minutes. The focal length of the lens under this steady state thermal load may be readily determined, and the lens may be placed such that the focal spot of the lens is located at the irradiation site when the lens is under thermal load, rather than when the lens is not under such load.

However, if the laser is turned on and off in periods of less than the time necessary for the lens to reach a steady state thermal load, but long enough to create some thermal load on the lens, then the focal spot may move slightly depending upon the particular amount of thermal load on the lens at any given moment.

There are at least two ways in which the laser may be turned on and off. First, in EUV systems, as in many integrated circuit production systems, there is generally a container called a "boat" which holds the wafers that are to be irradiated by the EUV beam; when the boat is changed to place a new set of wafers in the EUV beam path, the laser is typically turned off and no EUV light is produced during the period in which one boat is removed and the next inserted. This may generally take up to a minute or so, after which the laser is then turned back on, thus creating transient thermal effects both when the laser is turned off and when it is turned back on.

In addition, newer systems use laser pulses, and allow the user to set the conditions of the pulsing, and thus the production of EUV light. In one example, a burst of pulses for irradiating an exposure field on a wafer may include 20,000 pulses of 30 ns each, at a pulse repetition rate of 40 KHz, so that the total burst lasts for 0.5 second. In between bursts, the scanner holding the wafer re-aligns the wafer to allow for the irradiation of a different exposure field; this realignment may take, for example, 0.1 second.

The duty cycle is considered to be the percent of time that the light source, i.e., the laser, is operating at the specified pulse repletion rate. It is generally expected that a change in the duty cycle of more than about 20 percent will result in thermal transients in the lens, and that these transients may take several minutes to stabilize.

The amount of change in the focal length of the lens will vary with each particular lens and may not seem great; for example, a lens with a nominal focal length of 300 mm may vary by approximately 1 mm in either direction, i.e. from 299 to 301 mm, and possibly less than that. However, in comparison with a typical target size of 30 microns, this movement of the focal spot may be enough to reduce the coupling between the laser beam waist and the target and thus create problems in production of the plasma.

Prior attempts to compensate for thermal effects in EUV systems have concerned the focal spot of the EUV beam and the resulting exposure of the scanner, rather than the focal spot of the laser focusing lens. These are significantly different problems. The scanner is not part of the EUV light production, and thus any change in the focal spot of the EUV beam does not change the power produced by the EUV source, but only the location of maximum intensity of the EUV beam. Thus, in attempting to compensate for such a change in the focal length of the EUV beam it is sufficient to merely calculate the power received at the scanner over time, since whether the scanner is located at the focal spot or not does not change the power produced by the EUV source; if the scanner is not at the optimal focal spot, compensation for the decreased power of the EUV beam may generally be provided by lengthening the exposure time.

In the case of the laser focusing lens, however, the target material itself forms one end of the laser cavity and thus must initially be present at the proper location to cause lasing to occur. The lasing in turn causes the change in lens temperature for which compensation is desired. For this reason, changing the focal spot in this situation changes the end of the laser cavity, and thus also changes the power that goes into the lens. Since both the power and focal spot are changing simultaneously, determining the thermal effect on the lens and the focal spot becomes a much more complicated problem.

Because of this interaction, it has proven difficult to characterize the shift of the focal length, and thus the focal spot, of the lens under thermal load and to compensate for such shift. It is believed that existing EUV systems do not address this issue, and that the users thereof simply live with the decrease in efficiency that accompanies thermal loading and the resulting shift of the focal spot.

SUMMARY OF THE INVENTION

Disclosed herein are a method and apparatus for compensating for thermal effects on the focal spot of a lens used to focus a laser beam on a target material at an irradiation site in a laser produced plasma (LPP) extreme ultraviolet (EUV) light system.

One embodiment describes a method of controlling the focal point of the focusing lens in an EUV light source having a laser source emitting a laser beam, a plasma chamber in which droplets of an EUV light emitting material are irradiated by the laser beam at an irradiation site, and a focusing lens for focusing the laser beam to a focal spot within the plasma chamber, comprising: determining an amount of thermal load created on the lens by the laser beam at each point in time of a series of points in time; determining, for each point in time of the series of points in time, an expected change in the focal spot of the lens compared to a nominal focal spot of the lens due to the amount of thermal load; and adjusting, for each point in time of the series of points in time, the position of the lens to compensate for the expected change in the focal spot of the lens compared to the nominal focal spot of the lens due to the amount of thermal load, such that the focal spot remains substantially at the irradiation site over the series of points in time.

Another embodiment provides an EUV light source comprising: a laser source outputting a laser beam; plasma chamber having within it an irradiation site at which an EUV emitting material may be irradiated by the laser beam to create an EUV light emitting plasma; a beam delivery system directing the laser beam along an axis to the irradiation site the beam deliver system having a focusing lens centered on the axis with a nominal focal spot at the irradiation site when no thermal load is placed upon the lens; means for determining an amount of thermal load created on the lens by the laser beam at each point in time of a series of points in time; means for determining, for each point in time of the series of points in time, an expected change in the focal spot of the lens compared to a nominal focal spot of the lens due to the amount of thermal load created on the lens by the laser beam at each point in time of the series of points in time; and means for adjusting, for each point in time of the series of points in time, the position of the lens nominal focal spot of the lens due to the amount of thermal load such that the focal spot remains substantially at the irradiation site over the series of points in time.

In still another embodiment, a non-transitory computer-readable medium is described, having embodied thereon a program, the program being executable by a processor to perform a method of controlling the focal point of the focusing lens in an EUV light source having a laser source emitting a laser beam, a plasma chamber in which droplets of an EUV light emitting material are irradiated by the laser beam at an irradiation site, and a focusing lens for focusing the laser beam to a focal spot within the plasma chamber, the method comprising the steps of: determining an amount of thermal load created on the lens by the laser beam at each point in time of a series of points in time; determining, for each point in time of the series of points in time, an expected change in the focal spot of the lens compared to a nominal focal spot of the lens due to the amount of thermal load created on the lens by the laser beam at each point in time of the series of points in time; and adjusting, for each point in time of the series of points in time, the position of the lens to compensate for the expected change in the focal spot of the lens compared to the nominal focal spot of the lens due to the amount of thermal load, such that the focal spot remains substantially at the irradiation site over the series of points in time.

DETAILED DESCRIPTION OF THE INVENTION

The present application describes a method and apparatus for compensating for thermal effects on the focal spot of a lens used to focus a laser beam on a target material at an irradiation site in a laser produced plasma (LPP) extreme ultraviolet (EUV) light system.

In one embodiment, a method of compensating for such thermal effects involves measuring the EUV energy output of the light system at sample intervals, estimating the thermal load on the focusing lens from the measured EUV power, adjusting the lens position to compensate for focal length changes from the thermal load, and measuring the lens position and insuring that it remains in substantially the desired position.

Figure 1:
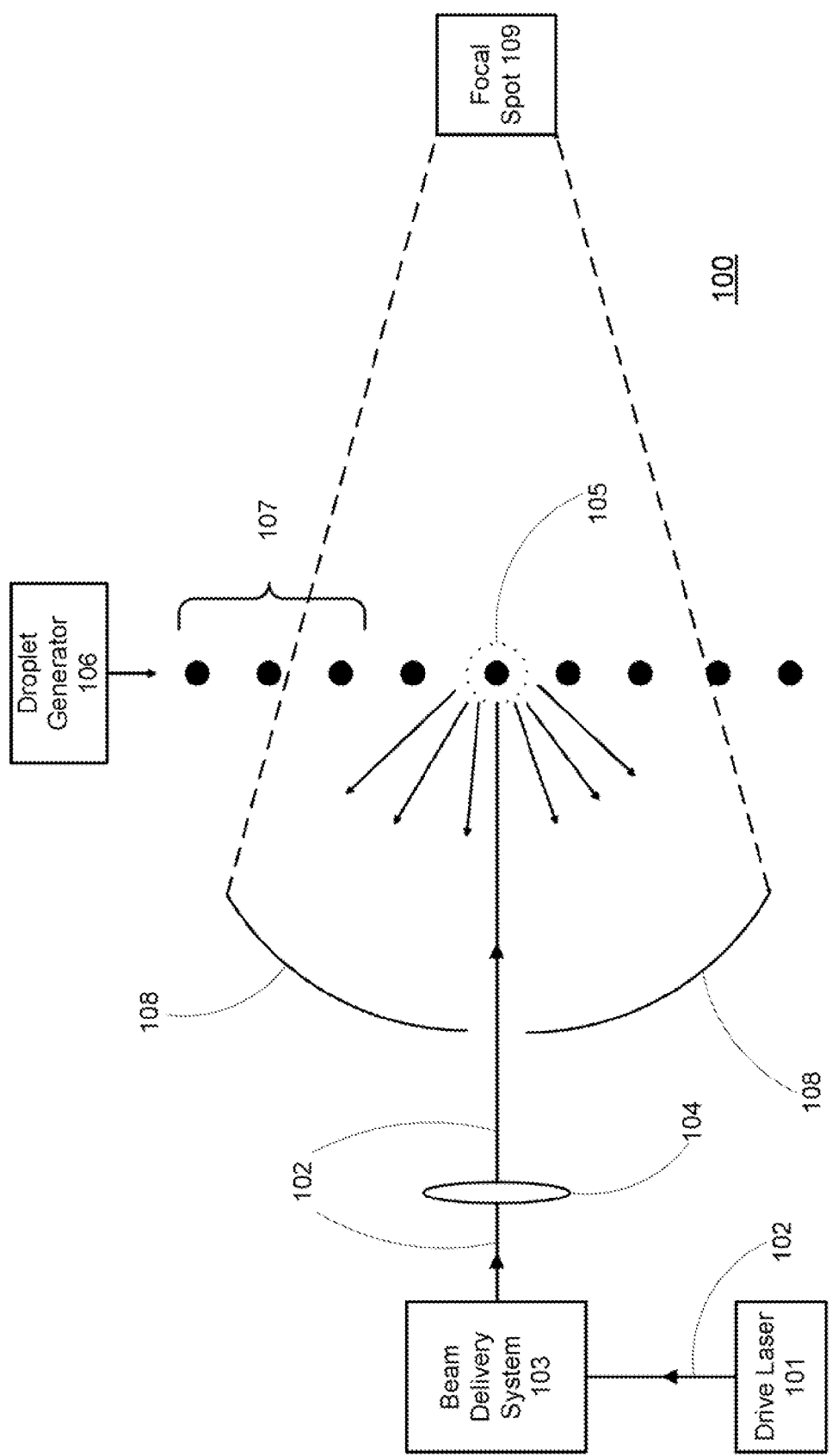
FIG. 1 is an illustration of some of the components of a typical LPP EUV system.

FIG. 1 illustrates some of the components of a typical LPP EUV system 100. A drive laser 101, such as a $CO_2$ laser, produces a laser beam 102 that passes through a beam delivery system 103 and through focusing lens 104. Focusing lens 104 has a nominal focal spot at irradiation site 105. A droplet generator 106 produces droplets 107 of an appropriate target material that, when hit by laser beam 102, produce a plasma which gives off EUV light. A mirror 108 focuses the EUV light from the plasma at position 109, the focal spot of mirror 108. Position 109 will typically be within a scanner (not shown) containing the boats of wafers that are to be exposed to the EUV light, with a portion of the boat containing wafers currently being irradiated being located at position 109. In some embodiments, there may be multiple drive lasers 101, with beams that all converge on the final focusing lens 104.

One type of LPP EUV light source may use a $CO_2$ laser and a ZnSe (zinc selenide) lens with an anti-reflective coating and a clear aperture of about 6 to 8 inches. Empirical observations have shown that the change in the focal length of such a lens due to thermal changes in the lens appears to include two effects that occur on different time scales, i.e., one effect occurs faster than the other. The faster effect appears to indicate that there is some portion of the lens with a relatively small mass that heats up quickly, such that thermal stability is reached within about a minute and a half; it is believed that this small mass is the coating on the lens or the lens mounting. The other effect is slower, on the order of three minutes or more, and thus appears to be due to a larger mass; it is believed that this larger mass is the lens material itself, in this case the zinc selenide. It also appears that the two effects occur, in opposite directions, i.e., that the faster thermal effect increases the focal length of the lens, while the slower effect shortens the focal length of the lens.

From these observations, a mathematical model was developed that represents the expected variation of the focal length of the lens due to the thermal effects on the lens. As will be discussed further below, the model contains four constants. Two of these are "time" constants, representing the speeds at which the thermal effects take place. The other two constants are displacement scalings, which represent the amount of change of the focal length of the lens that is expected to occur due to the thermal effects of the lens receiving a specified amount of power.

Due to the limitations of the manufacturing process, any two lenses are expected to be slightly different, even if they are made by exactly the same process. The mass of each lens, and the properties or thickness of the coating applied, will generally vary slightly. Thus, each lens is preferably calibrated and compared to the model in order to determine the time constants and scaling corresponding to those time constants.

Figure 2:
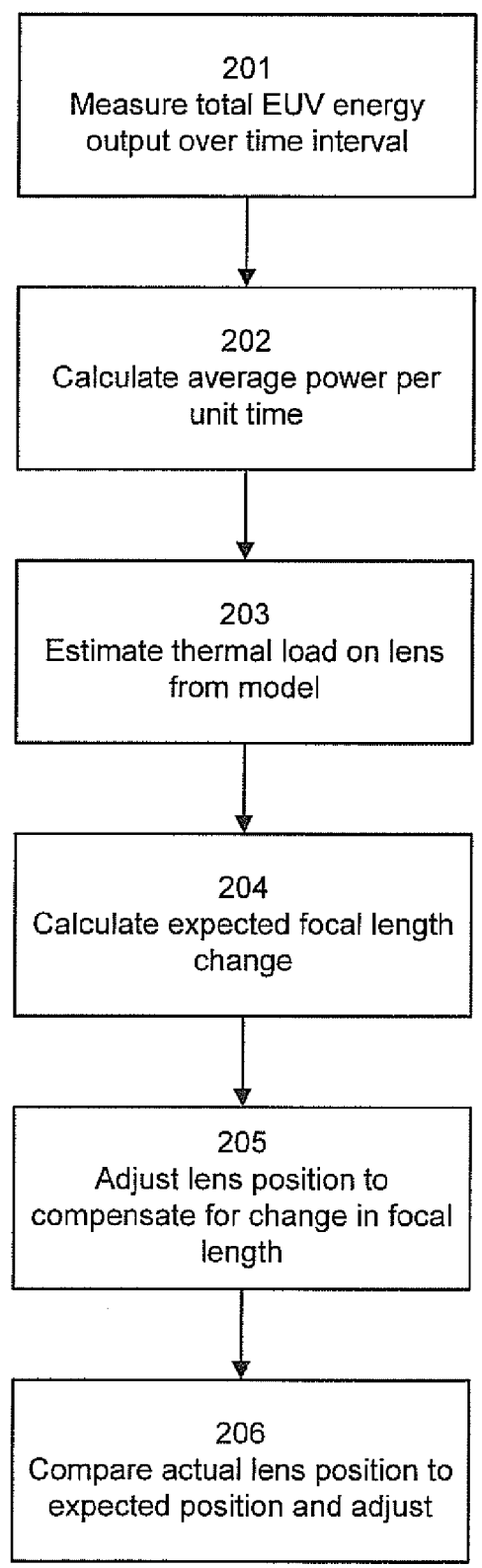
FIG. 2 is a simplified flow chart of a method of positioning the final laser focus lens in an LLP EUV system according to one embodiment.

FIG. 2 is a simplified flow chart of a method according to one embodiment of the present invention. At step 201, the total EUV energy output of the system over some time interval is measured with sensors. The EUV output is used as a proxy for the laser power, since the power output by the EUV system is related to the laser power that produces the plasma, and thus to the laser power input into the lens. In other embodiments, the laser power itself may be measured directly.

Next, at step 202, the total EUV energy output is divided by the sample time interval to get the average power per unit of time. At step 203, the thermal load on the lens from the measured average power is estimated according to the mathematical model mentioned above. The expected focal length change from the thermal load is then calculated at step 204. At step 205, the lens position is adjusted to compensate for the change in the focal length due to the thermal load, in order to keep the focal spot substantially at the irradiation site over time.

At step 206, a feedback loop is used to compare the actual position of the lens to its expected position and adjust the position if necessary. This may, for example, be done with a linear variable differential transformer (LVDT), a type of electrical transformer known in the art and used for measuring linear displacement. This further allows the focal spot of the lens to remain substantially at the irradiation site over time as the system is operated.

The mathematical model of the lens motion that is used to compensate for thermal effects will now be described. The thermal effects are generally modeled as two low pass filters that produce thermal effect states based upon the average power put into the lens. The lens displacement is proportional to the two thermal effect states.

Each thermal process can be modeled as a first-order decaying exponential equation, such that at a time t the thermal state $X_{thermal}[t]$ is given by $$x_{thermal}[t] = K e^{-1/\alpha t} p_{avg}[t]$$

where $\alpha$ is the time constant for the respective thermal process. The fast and slow thermal processes will of course have different time constants.

Again, the EUV output power is used as a proxy for the laser power to determine the thermal effects on the lens. The average power $P_{avg}[t]$ output by the LLP EUV system at a time t is given by $$p_{avg}[t] = \frac{\int EUV \, dt}{\Delta t}$$

The total of the output power of the system over a period of time $\int EUV$ is differentiated with respect to the elapsed time $\Delta t$ to get the average power.

The thermal state of the lens and the resulting lens motion necessary to keep the focal spot at a constant irradiation site at a time t is given by $$x_{thermal1}[t] = \left( \frac{\tau_1}{1 - (1 - \tau_1) q^{-1}} \right) p_{avg}[t]$$

$$x_{thermal2}[t] = \left( \frac{\tau_2}{1 - (1 - \tau_2) q^{-1}} \right) p_{avg}[t]$$

$$\text{Lens}[t] = g_1 x_{thermal1} + g_2 x_{thermal2}$$

$X_{thermal1}[t]$ and $X_{thermal2}[t]$ represent the thermal state of the lens due to the slow and fast thermal effects, respectively. A delay factor $q^{-1}$ indicates that whatever value it is "multiplied" by is from the prior sample time t−1. Lens[t] is the necessary lens motion. These equations convert the average power into a distance value for moving the lens.

The model contains four constants; two of these, $\tau_1$ and $\tau_2$, are unit-less constants related to time, one representing the faster thermal effect and the other the slower thermal effect. It can be shown mathematically that, assuming that $K=1/\alpha$ in the decaying exponential form above for ease of derivation, and using a Laplace transformation and a discrete-time domain, i.e., as if sampled by computer, $\tau_1$ and $\tau_2$ are given by $$\tau_1 = \frac{\Delta t}{\Delta t + \alpha_1}$$

$$\tau_2 = \frac{\Delta t}{\Delta t + \alpha_2}$$

where $\alpha_1$ and $\alpha_2$ are the time constants of the respective thermal processes.

The other two constants $g_1$ and $g_2$ are displacement constants which represent the amount of change of the focal length of the lens that is expected to occur due to the thermal effects of the lens receiving a specified amount of power, and are measured in units of distance per unit of power. Since each $X_{thermal}[t]$ is based upon the average power, it is also in units of power, such as watts or milliwatts, and the value of Lens[t] will thus be a distance since the g values of distance per unit of power are multiplied by the number of units of power.

One displacement constant thus indicates the expected change in focal length in a short period of time due to the faster thermal effect of a given power on the smaller lens mass, and the other displacement constant indicates the expected change in focal length in a longer period of time due to the slower thermal effect on the larger lens mass. It will also be seen that the larger value of τ will result in the value of $X_{thermal}[t]$ changing faster, and thus represents the faster thermal effect.

Multiplying the "faster" displacement constant by the fast change in the thermal state results in the distance the lens should be moved to compensate for the fast thermal effect. Similarly, multiplying the "slower" displacement constant by the slow change in the thermal state, results in the distance the lens should be moved to compensate for the slow thermal effect. Adding them together yields the total motion of the lens necessary to compensate for both thermal effects. Again, the two motions are in opposite directions.

It will easily be seen mathematically that an alternative way of presenting the equations for the thermal states $X_{thermal1}[t]$ and $X_{thermal2}[t]$ is as follows:

$$x_{thermal1}[t] = x_{thermal1}[t-1] + \tau_1(p_{avg}[t] - x_{thermal1}[t-1])$$

$$x_{thermal2}[t] = x_{thermal2}[t-1] + \tau_2(p_{avg}[t] - x_{thermal2}[t-1])$$

$$\text{Lens}[t] = g_1 x_{thermal1} + g_2 x_{thermal2}$$

Thus, each thermal state at time t is based upon the thermal state at time t−1, the average power $P_{avg}[t]$, and the associated value of τ. As above $P_{avg}[t]$ may be easily calculated by integrating the output power over some period of time, and then differentiating with respect to time, i.e., by multiplying the integrated power by the time period Δt between times t and t−1. One of skill in the art will readily appreciate that this method of calculating the thermal states $X_{thermmal1}[t]$ and $X_{thermal2}[t]$ is more easily implemented in computer code than the previous form above, and thus this latter form is referred to as "pseudo-code."

It will also be seen that at the steady state, each thermal state does not change, i.e., $X_{thermal}[t] = X_{thermal}[t-1]$, and the thermal state $X_{thermal}[t]$ is just the average power $P_{avg}[t]$. The sum of the two lens motions will thus be the amount that it is necessary to move the lens to keep the focal spot at the irradiation site under steady state conditions.

As mentioned above, since each lens is different, in order to determine the values of $\tau_1$, $\tau_2$, $g_1$ and $g_2$ for a particular lens, the lens should be calibrated. To calibrate a lens, an expected duty cycle is simulated. Power to a laser is increased from an "off" or minimal power state to an output that is expected in the intended use of the LLP EUV system. The thermal transients are estimated, and the lens is moved in an attempt to compensate for the thermal effects and keep the focal spot at the irradiation site, and to keep the EUV power output constant.

Thus, for example, a system might be started at a 1 percent duty cycle to determine the nominal focal length of the lens (since the lens has to be focusing something in order to determine the focal spot), which might be 300 mm. If the user of the system expects to run it at an 80 percent duty cycle, the power is increased to a level corresponding to that duty cycle. If the average laser power at an 80 percent duty cycle is 20 watts, the power might be increased rapidly from 1 watt to 20 watts to simulate the system going from an "off" state to an 80 percent duty cycle.

Initially there will be a sharp increase in EUV output that is nearly a step-function. However, as the lens heats up, its focal spot will change, and the EUV output will not stay constant without some adjustment of the lens position. This change in focal length occurs over time as above; thus, calibration is an attempt to determine how fast the lens should be moved to compensate for the both the fast and slow thermal effects, and to set the constants in the mathematical model accordingly.

This is done by seeking to create a trajectory of the lens motion that keeps the EUV output at or near its maximum level at all times in between the minimal power state and the full thermal load, i.e., the steady state. The laser is turned on at the desired duty cycle, and then the lens is moved at approximately constant intervals, for example one second, and the resulting EUV output measured. The movement of the lens may be performed either manually or automatically.

It is believed to be more efficient to determine the value of τ[fast] and the displacement constant g[fast] for the fast thermal effect first, simply because the fast thermal effect again reaches stability in approximately one and one-half minutes, while the slow thermal effect takes longer to reach stability. The description below takes this approach, but it is possible to address the slow thermal effect first if that is desired for some reason.

The laser is turned on, and the lens is moved slightly away from the irradiation site (again, the fast thermal effect lengthens the focal length of the lens) once each second in an attempt to keep the EUV output power constant. This process is repeated as necessary by turning the laser off and on multiple times, until an appropriate trajectory has been determined that keeps the EUV output approximately constant, within a desired margin, during the one and one-half minute period.

Once the trajectory has been determined, a maximum change in focal length will be apparent, and this is the value of the displacement constant g[fast] for the fast thermal effect. The value of the gain τ[fast] for the fast thermal effect will depend upon how fast the lens has had to be moved to keep the output EUV power constant. One of skill in the art will appreciate how to set τ[fast] such that the needed movement of the lens is approximated by a curve representing a first-order exponential of the form $$e^{-\tau[fast]t}$$

Once this is done, a similar process is followed to determine a trajectory that results in approximately constant EUV power output during the longer time period of the slow thermal effect. The laser is again turned on and off, and the lens is again moved, again attempting to keep the EUV output power constant. Now, however, once the maximum adjustment of the lens position due to the fast thermal effect has been reached, the lens is moved in the opposite direction, toward the irradiation site, as again the slow thermal effect shortens the focal length of the lens. The value of the gain τ[slow] is set in a fashion similar to that of the fast gain constant such that the lens movement is again approximated by a first-order exponential as above.

Again, once the trajectory has been determined, the final position of the lens needed to compensate for both thermal effects will be apparent. The displacement constant g[slow] for the slow thermal effect is considered to be the displacement necessary for the sum of g[fast] and g[slow] (i.e., $g_1$ and $g_2$ in the equations above) to result in the final position of the lens (remembering that the displacements have different signs since they are in opposite directions).

For example, in calibrating a particular lens, it might be determined that the focal length of the lens eventually shortens from 300 mm to 299.5 mm, i.e., that at steady state the lens should be moved 0.5 mm closer to the irradiation site to keep the focal spot at the irradiation site and maintain maximum EUV output per laser pulse. However, it might also be determined that the lens initially should be moved 0.1 mm away from the irradiation site to compensate for the fast thermal effect, and then more slowly moved 0.6 mm back toward the irradiation site as the slow thermal effect takes effect. In this case, g[fast] would be −0.1 mm, and g[slow] 0.6 mm (the positive direction being defined as toward the irradiation site), so that as above the sum results in the final 0.5 mm movement needed to keep the output at maximum in the steady state.

Note that while the above discussion refers to moving the lens during calibration, in an alternative embodiment it is possible to move the irradiation target material along the axis of the laser beam during calibration if that is easier, again seeking to keep the target material within the focal waist of the lens. However, this is not done during actual operation of the system.

Figure 3:
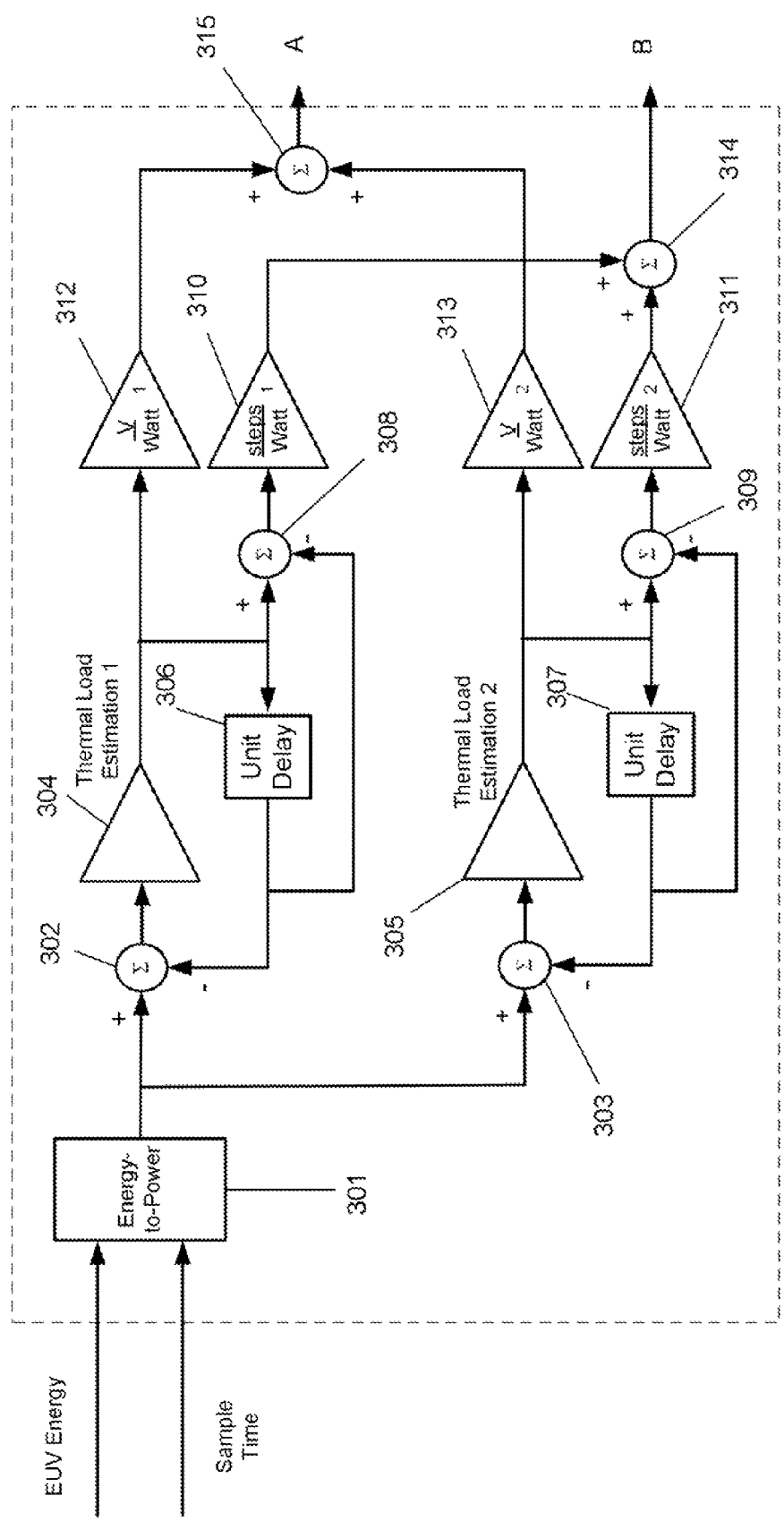
FIG. 3 illustrates a logic circuit for calculating the desired position of the final laser focus lens in an LLP EUV system in one embodiment.

Once the constants have been calculated, the lens motion model above may be embodied in hardware so that the lens is automatically moved during operation of the EUV system. FIG. 3 illustrates one embodiment of a logic circuit for calculating the desired position of the lens using the mathematical model described above. As above, the logic circuit essentially represents two low pass filters, one for calculating the movement corresponding to the fast thermal effect, and the other for the slow thermal effect.

The EUV output energy received over a sample period and the length of the sample period are inputs to the circuit, and are received by energy-to-power calculator 301, which calculates the average power produced during the sample period. The calculated average power figure is fed to two adders 302 and 303, and from the adders to two thermal load estimators 304 and 305. At the end of the first sample period, there will be no second signal fed back to adders 302 and 303, so the calculated average power will be fed to thermal load estimators 304 and 305.

The following discussion assumes that the filter containing thermal load estimator 304 calculates the necessary motion of the lens to compensate for the fast thermal effect, and the block containing thermal load estimator 305 the slow thermal effect, although these can of course be reversed. Turning first to the fast thermal effect, thermal load estimator 304 multiplies the average power by the determined gain τ[fast] to determine the estimated thermal load on the lens, again a power measurement, due to the fast thermal effect.

The resulting estimated thermal load is then sent to a unit delay circuit 306, and another adder 308. The unit delay circuit 306 feeds the estimated thermal load back to adder 302 after a delay of one sample period. The unit delay circuit 306 also sends the estimated thermal load to adder 308 after the same delay of one sample period.

At the end of the second sample period, defined as time k, the input to thermal load estimator 304 is the average power during the second interval minus the estimated thermal load from the first sample period, i.e., the average power calculated at time k less the estimated thermal load at time k−1. From this input, the thermal load estimator 304 now calculates the change in the estimated thermal load at time k.

At the end of the first sample period, time k−1, adder 308 initially receives the estimated thermal load as above. At the end of the second sample period, i.e., at time k, adder 308 receives the estimated thermal load at time k from thermal load estimator 304, as well as the estimated thermal load at time k−1 from unit delay circuit 306. These are given opposite signs, so that the output of adder 308 is a power measurement of the change in the estimated thermal load on the lens from the fast thermal effect at the end of each sample period. (Thus, the output of adder 308 at the end of the first period correctly provides the initial estimated thermal load, since the prior thermal load was zero.)

The output of adder 308 goes to step calculator 310, which converts the power measurement output of adder 308 (in watts, or milliwatts) into the number of steps of a specified distance, for example, microns, that the lens must be moved to compensate for the change in thermal load on the lens. It will be seen that the value used in step calculator 310 is directly related to the displacement g[fast] used in the mathematical model above, with the number of steps varying depending upon whether a step is defined as, for example, one micron or 10 microns.

The other filter, containing adders 303 and 309, thermal load estimator 305, unit delay circuit 307 and step calculator 311, functions in the same manner. However, the gain used in thermal load estimator will be τ[slow], and the value used in step calculator 311 will be related to g[slow].

The outputs of step calculators 310 and 311 are added by adder 314 to obtain the number of steps (and thus the distance, since the steps are of a specified distance each) that the lens should be moved to compensate for the combination of the fast thermal effect and the slow thermal effect. The calculated number of steps is sent to a servo which moves the lens accordingly.

Figure 4:
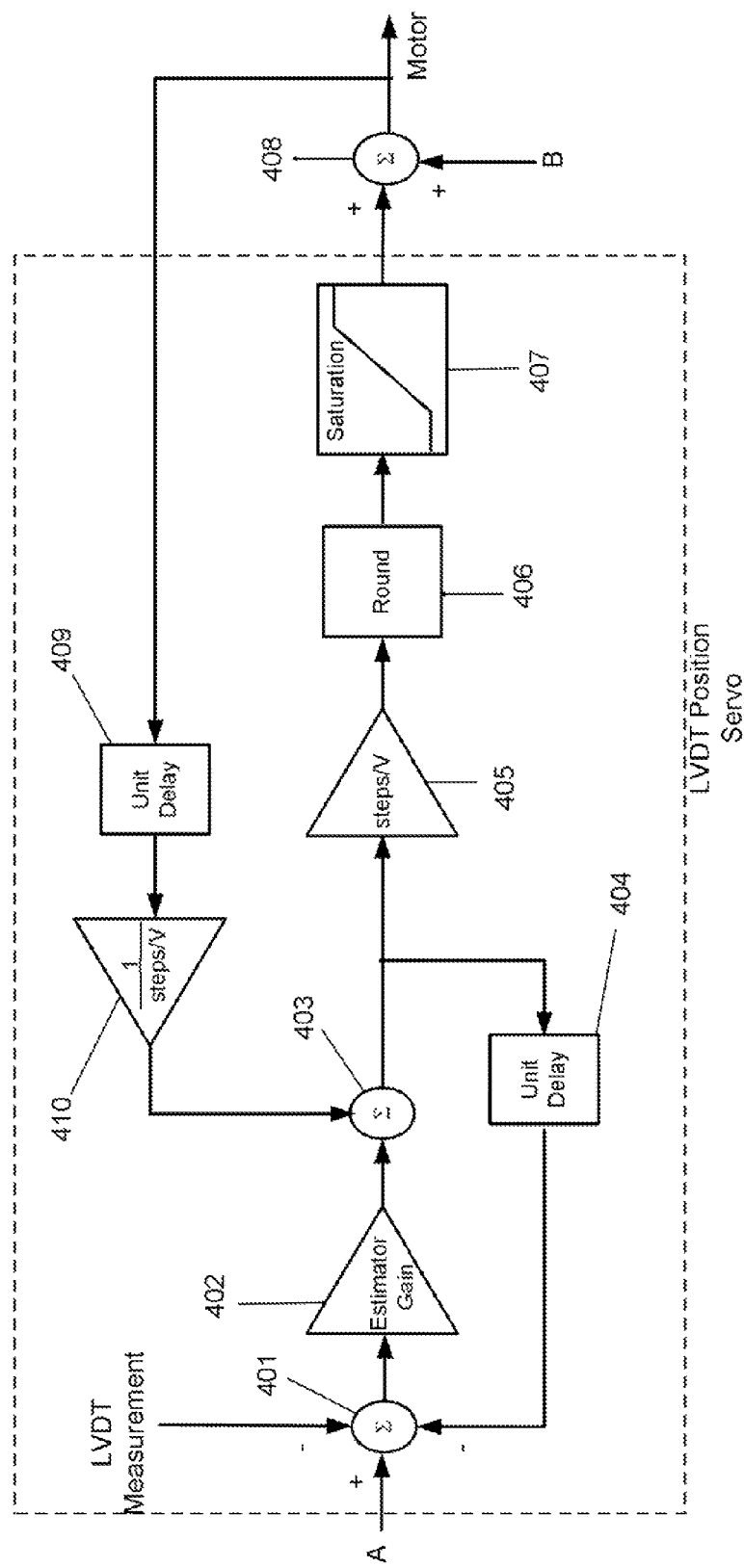
FIG. 4 illustrates a logic circuit for moving the final laser focus lens and confirming and adjusting its position in an LLP EUV system in one embodiment.

The power outputs of the thermal load estimators 304 and 305 are also fed to voltage calculators 312 and 313, where they are converted to volts per watt (rather than to the steps per watt of step calculators 310 and 311) and then summed by adder 315, for use in the monitoring of the lens position as discussed below with respect to FIG. 4.

It will be apparent that the gain of thermal load estimator 304 will be larger than that of thermal load estimator 305, and the output of adder 308 will initially grow faster than that of adder 309, reflecting the faster thermal effect. Thus, the effect on lens movement of step calculator 310 will initially dominate that of step calculator 311. However, for the same reason, the output of adder 308 will also reach its maximum point and then drop to zero faster, reflecting the steady state of the fast thermal effect, and over a longer period of time the output of step calculator 311 will increase and become the dominant factor in the lens movement, reflecting the larger contribution of the larger mass to the total thermal effect.

It will also be seen that in the final steady state, after each step calculator has contributed its maximum movement, the lens will move to the position determined by the difference in the maximum movements specified by the fast thermal effect and the slow thermal effect. (This again assumes that the thermal effects are in opposite directions, as appears to be typical. If they are in the same direction, then the final position will be the sum of the maximum movements of each.) In general, the slow thermal effect causes greater final movement of the lens than the fast thermal effect, again presumably due to the greater mass, but in some cases they may cause approximately the same amount of movement, meaning that in the steady state the lens does not need to be moved much to maintain maximum power.

It may be seen that the logic circuit of FIG. 3 may be represented by computer code representing the following equations. For a sufficiently long period of time divided into sample points k,

```
for k = 2:length(Time);
    state1(k) = state1(k−1) + gain1 * ( integratedEUV(kk) *
    timeSinceLastAlgoRun(kk)/1000 − state1(k−1) );
    state2(k) = state2(k−1) + gain2 * ( integratedEUV(kk) *
    timeSinceLastAlgoRun(kk)/1000 − state2(k−1) );
end
``` where gain1 and gain2 are the fast and slow gains described above. The lens displacement is then given by $$LensDisp = ld1*state1(k) + ld2*state2(k)$$

where ld1 and ld2 are the fast and slow displacements described above.

Once it has been determined by the above-described method where the lens should be located to maintain maximum output power, a mechanism is desirable to actually move the lens, and to confirm that it is placed in the desired chosen. FIG. 4 illustrates one embodiment of a logic circuit for moving the lens and confirming its position.

The position of the lens is measured and represented by a voltage. This may, for example, be done by using a linear variable differential transformer (LVDT), a type of electrical transformer known in the art and used for measuring linear displacement. The voltage from this measurement is fed to adder 401. Adder 401 also receives the signal from adder 315 of FIG. 3, the sum of the volts per watt from voltage calculators 312 and 313, which represents the desired position of the lens. The voltages are determined so as to be on similar scales, and to have opposite polarities.

Adder 401 adds the voltage representing the actual position of the lens from the LVDT to the voltage from adder 315 representing the desired position of the lens; the difference between the voltages represents the error, i.e., how far the lens is from its desired position. This error voltage is then scaled by estimator 402, and fed to adder 403.

The output of adder 403 is fed to converter 405, which is calibrated to convert the voltage into the number of steps of a predetermined size that the lens should be moved to arrive at the desired position from its actual position. Thus, the output of converter 405 is in steps per volt. Rounder 406 receives the calculated number of steps from converter 405 and rounds the calculated number of steps to the closest whole number, since the lens cannot be moved a fraction of a step.

Saturation limiter 407 limits the number of steps that may be executed in a given time interval. For example, if the calculated number of steps is 50, and the time interval is 1 second, but it is physically possible to move the lens only 20 steps in a second, saturation limiter 407 cuts the number of steps to 20. The result, either the actual number of calculated steps or the limited number of steps, is fed to adder 408, and output to a motor to move the lens the determined number of steps.

The output of adder 408 is fed back through a unit delay 409 and converted back into voltage by converter 410. This is to indicate what steps were actually taken. For example, if the calculation yielded 50 steps but only 20 steps were taken as above, without such feedback it might be assumed that all 50 steps were taken and a subsequent calculation may thus be erroneous. The resulting "reconverted" voltage is fed back to adder 403 and subtracted from the output of estimator 402, so that the steps already taken reduce the error value for which correction is desired.

The output of adder 403 is also fed back to adder 401 after a time delay of one sample period via unit delay circuit 404. Since the output of adder 403 is used to calculate a number of corrective steps as above, for the purpose of the input to the estimator 402 it is presumed that the steps needed to compensate for the prior error were taken. It will be noted that as above the error signal output by adder 403 is also already reduced by the signal from converter 410 and thus contains an indication of the steps already taken.

It will be noted that adder 408 also receives the number of steps needed to move the lens to correct for thermal effects from adder 314 of FIG. 3. Thus, the output to the motor is a combination of the number of steps needed to correct for thermal effects as determined by the circuit of FIG. 3 and the number of steps needed to correct the actual position to the desired position as determined by this circuit of FIG. 4.

Figure 5A:
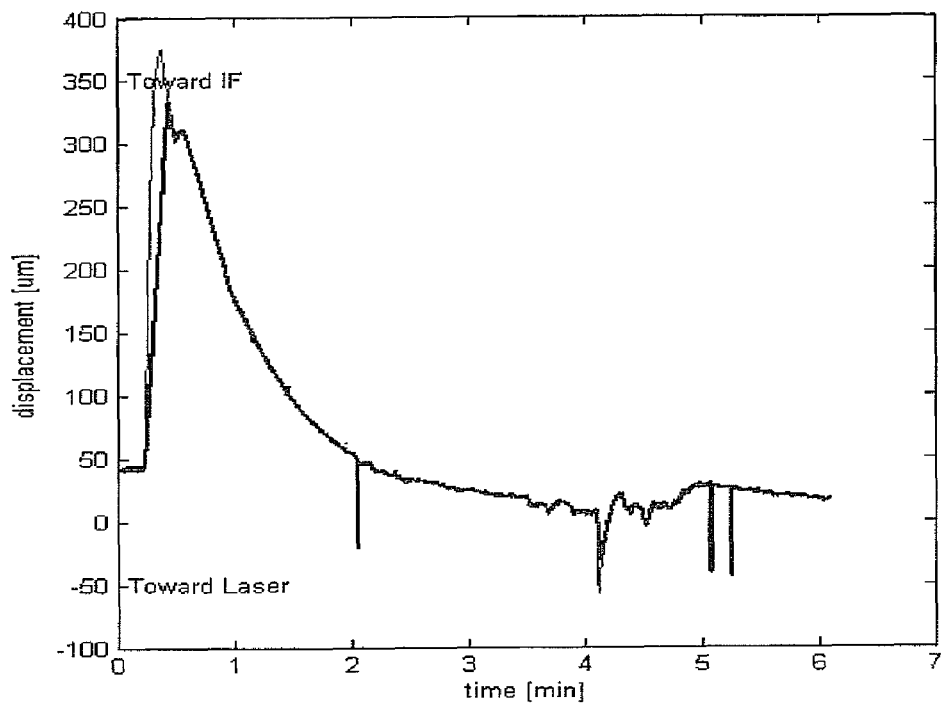
FIG. 5A is plot of the movement of a lens over time that might be obtained in an embodiment.
Figure 5B:
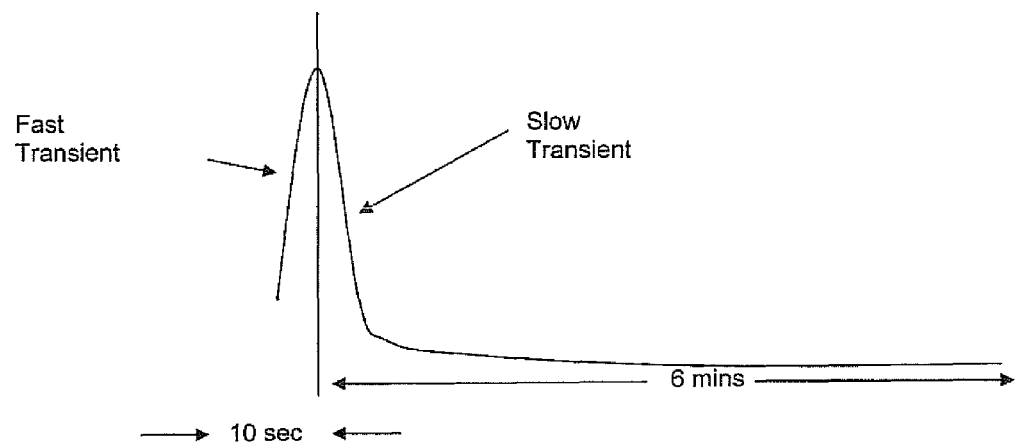
FIG. 5B shows an idealized sample curve of what might be expected for a theoretical lens using a mathematical model of one embodiment.

FIG. 5A shows a plot that might be obtained of the movement of a focusing lens over time in an EUV system to correct for changes in the focal length of the focusing lens according to an embodiment of the invention. For comparison, FIG. 5B shows an idealized sample curve of what might be expected for a theoretical lens using the mathematical model described herein. It can be seen that the actual plot is similar to the theoretical one, and that the lens movement generally corresponds to the mathematical model described herein. There is an early displacement in one direction in the first fraction of a minute (10 seconds in FIG. 5B), which is due to the fast thermal effect. This is followed by a slower displacement in the opposite direction over several minutes, due to the slow thermal effect. Both movements are generally as predicted by the mathematical model described herein.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used, and possibly different types of drive lasers and/or focus lenses.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A method of controlling the focal point of the focusing lens in an EUV light source having a laser source emitting a laser beam, a plasma chamber in which droplets of an EUV light emitting material are irradiated by the laser beam at an irradiation site, and a focusing lens for focusing the laser beam to a focal spot within the plasma chamber, comprising:
   determining an amount of thermal load created on the lens by the laser beam at each point in time of a series of points in time;
   determining, for each point in time of the series of points in time, an expected change in the focal spot of the lens compared to a nominal focal spot of the lens due to the amount of thermal load; and
   adjusting, for each point in time of the series of points in time, the position of the lens to compensate for the expected change in the focal spot of the lens compared to the nominal focal spot of the lens due to the amount of thermal load, such that the focal spot remains substantially at the irradiation site over the series of points in time.

2. The method of claim 1 wherein determining the amount of thermal load created on the lens by the laser beam at each point in time of the series of points in time comprises:
   measuring the output power of the EUV light source at each point in time of the series of points in time;
   determining a change in the output power of the EUV light source at each point in time of the series of points in time by comparing the measured output power at each point in time to the measured output power at an immediately preceding point in time of the series of points in time; and
   estimating an amount of thermal load created on the lens at each point in time of the series of points in time from the change in output power of the EUV light source at each point in time of the series of points in time.

3. The method of claim 1 wherein determining the amount of thermal load created on the lens by the laser beam at each point in time of the series of points in time comprises:

measuring the output power of the laser source at each point in time of the series of points in time;

determining a change in the output power of the laser source at each point in time of the series of points in time by comparing the measured output power at each point in time to the measured output power at an immediately preceding point in time of the series of points in time; and estimating an amount of thermal load created on the lens at each point in time of the series of points in time from the change in output power of the laser source at each point in time of the series of points in time.

4. The method of claim 1 wherein determining, for each point in time of the series of points in time, the expected change in the focal spot of the lens compared to the nominal focal spot of the lens due to the thermal load comprises using a mathematical model of the lens relating an expected change in the focal spot to the thermal load created on the lens to calculate the expected change in the focal spot of the lens based upon the determined thermal load.

5. The method of claim 4, wherein the mathematical model of the lens models the lens as a first mass and a second mass.

6. The method of claim 5, wherein the first mass and the second mass are each modeled as a first-order decaying exponential equation.

7. The method of claim 6, wherein determining, for each point in time of the series of points in time, an expected change in the focal spot of the lens further comprises implementing the mathematical model as two low-pass filters.

8. The method of claim 6, wherein each first-order decaying exponential equation has a gain constant and a displacement constant, and wherein determining, for each point in time of the series of points in time an expected change in the focal spot of the lens compared to a nominal focal spot, of the lens further comprises calibrating the lens to determine each of the constants.

9. The method of claim 1 further comprising, for each point in time of the series of points in time:

determining the actual position of the lens;

comparing the actual position of the lens to the expected change in the focal spot of the lens; and further adjusting the position of the lens to keep the focal spot substantially at the irradiation site.

10. An EUV light source comprising;

a laser source outputting a laser beam;

a plasma chamber having within it an irradiation site at which an EUV emitting material may be irradiated by the laser beam to create an EUV light emitting plasma;

a beam delivery system directing the laser beam along an axis to the irradiation site, the beam delivery system having a focusing lens centered on the axis with a nominal focal spot at the irradiation site when no thermal load is placed upon the lens;

means for determining an amount of thermal load created on the lens by the laser beam at each point in time of a series of points in time;

means for determining, for each point in time of the series of points in time, an expected change in the focal spot of the lens compared to a nominal focal spot of the lens due to the amount of thermal load created on the lens by the laser beam at each point in time of the series of points in time; and means for adjusting, for each point in time of the series of points in time, the position of the lens to compensate for the expected change in the focal spot of the lens compared to the nominal focal spot of the lens due to the amount of thermal load, such that the focal spot remains substantially at the irradiation site over the series of points in time.

11. The EUV light source of claim 10 wherein the means for determining the amount of thermal load created on the lens by the laser beam at each point in time of the series of points in time comprises:

a sensor for measuring the output power of the EUV light source at each point in time of the series of points in time;

comparison means for determining a change in the output power of the EUV light source at each point in time of the series of points in time by comparing the measured output power at each point in time to the measured output power at an immediately preceding point in time of the series of points in time; and logic means for estimating an amount of thermal load created on the lens at each point in time of the series of points in time from the change in output power of the EUV light source at each point in time of the series of points in time.

12. The EUV light source of claim 10 wherein the means for determining the amount of thermal load created on the lens by the laser beam at each point in time of the series of points in time comprises:

a sensor for measuring the output power of the laser source at each point in time of the series of points in time;

comparison means for determining a change in the output power of the laser source at each point in time of the series of points in time by comparing the measured output power at each point in time to the measured output power at an immediately preceding point in time of the series of points in time; and logic means for estimating an amount of thermal load created on the lens at each point in time of the series of points in time from the change in output power of the laser source at each point in time of the series of points in time.

13. A non-transitory computer-readable medium having embodied thereon a program, the program being executable by a processor to perform a method of controlling the focal point of the focusing lens in an EUV light source having a laser source emitting a laser beam, a plasma chamber in which droplets of an EUV light emitting material are irradiated by the laser beam at an irradiation site, and a focusing lens for focusing the laser beam to a focal spot within the plasma chamber, the method comprising the steps of:

determining an amount of thermal load created on the lens by the laser bears at each point in time of a series of points in time;

determining, for each point in time of the series of points in time, an expected change in the focal spot of the lens compared to a nominal focal spot of the lens due to the amount of thermal load created on the lens by the laser beam at each point in time of the series of points in time; and adjusting, for each point in time of the series of points in time, the position of the lens to compensate for the expected change in the focal spot of the lens compared to the nominal focal spot of the lens due to the amount of thermal load, such that the focal spot remains substantially at the irradiation site over the series of points in time.

* * * * *